(12) United States Patent
Parasher et al.

(10) Patent No.: US 7,514,476 B2
(45) Date of Patent: Apr. 7, 2009

(54) STABLE CONCENTRATED METAL COLLOIDS AND METHODS OF MAKING SAME

(75) Inventors: Sukesh Parasher, Lawrenceville, NJ (US); Cheng Zhang, Lawrenceville, NJ (US); Michael A. Rueter, Plymouth Meeting, PA (US); Bing Zhou, Cranbury, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 327 days.

(21) Appl. No.: 11/378,877

(22) Filed: Mar. 17, 2006

(65) Prior Publication Data

US 2007/0219084 A1 Sep. 20, 2007

(51) Int. Cl.
C09K 3/00 (2006.01)
C01B 15/029 (2006.01)

(52) U.S. Cl. .......... 516/78; 423/584; 502/208; 502/209; 502/210; 502/211; 502/213; 502/216; 502/219; 502/220; 502/221; 502/222; 502/223; 502/224; 502/226; 502/349; 502/350; 502/352

(58) Field of Classification Search ......... 502/300–355; 516/78, 97
See application file for complete search history.

(56) References Cited

U.S. PATENT DOCUMENTS

| | | | |
|---|---|---|---|
| 4,148,750 A | 4/1979 | Pine | 252/416 |
| 4,366,085 A | 12/1982 | Ikegami et al. | 252/431 |
| 4,652,311 A | 3/1987 | Gulla et al. | |
| 4,832,938 A | 5/1989 | Gosser et al. | 423/584 |
| 5,128,114 A | 7/1992 | Schwartz | 423/335 |
| 5,132,099 A | 7/1992 | Hiramatsu et al. | 423/584 |
| 5,338,531 A | 8/1994 | Chuang et al. | 423/584 |
| 5,372,981 A | 12/1994 | Witherspoon | 502/155 |
| 5,846,898 A | 12/1998 | Chuang et al. | 502/181 |
| 5,859,265 A | 1/1999 | Müller et al. | 549/531 |
| 5,925,588 A | 7/1999 | Chuang et al. | 502/181 |
| 5,961,948 A | 10/1999 | Wanngård | 423/584 |
| 6,054,507 A | 4/2000 | Funaki et al. | 523/210 |
| 6,090,746 A * | 7/2000 | Bonnemann et al. | 502/325 |
| 6,090,858 A | 7/2000 | El-Sayed | 516/97 |
| 6,168,775 B1 | 1/2001 | Zhou et al. | 423/584 |
| 6,239,054 B1 | 5/2001 | Shukis et al. | 502/29 |
| 6,455,594 B1 | 9/2002 | Tsuji | |
| 6,462,095 B1 * | 10/2002 | Bonsel et al. | 516/97 |
| 6,500,968 B2 | 12/2002 | Zhou et al. | 549/531 |
| 6,500,969 B1 | 12/2002 | Zhou et al. | 549/531 |
| 6,528,683 B1 | 3/2003 | Heidemann et al. | 562/542 |
| 6,534,661 B1 | 3/2003 | Zhou et al. | 549/531 |
| 6,551,960 B1 | 4/2003 | Laine et al. | 502/327 |
| 6,576,214 B2 | 6/2003 | Zhou et al. | 423/584 |
| 6,630,118 B2 | 10/2003 | Paparatto et al. | 423/584 |
| 6,649,140 B2 | 11/2003 | Paparatto et al. | 423/584 |
| 6,676,919 B1 | 1/2004 | Fischer et al. | 423/584 |
| 6,740,615 B2 | 5/2004 | Zhou | 502/29 |
| 6,746,597 B2 | 6/2004 | Zhou et al. | 208/138 |
| 6,888,013 B2 | 5/2005 | Paparatto et al. | 549/532 |
| 6,908,873 B2 | 6/2005 | Zhou et al. | 502/29 |
| 6,919,065 B2 | 7/2005 | Zhou et al. | 423/584 |
| 7,011,807 B2 | 3/2006 | Zhou et al. | 423/584 |
| 2003/0104936 A1 * | 6/2003 | Mao et al. | 502/339 |
| 2004/0081611 A1 | 4/2004 | Muller et al. | 423/584 |
| 2004/0147618 A1 * | 7/2004 | Lee et al. | 516/78 |
| 2004/0151659 A1 | 8/2004 | Paparatto et al. | 423/584 |
| 2004/0151660 A1 | 8/2004 | Paparatto et al. | 423/584 |
| 2004/0184983 A1 | 9/2004 | Paparatto et al. | 423/584 |
| 2005/0009696 A1 * | 1/2005 | Mao et al. | 502/325 |
| 2006/0079396 A1 * | 4/2006 | Saito | 502/167 |
| 2006/0094597 A1 * | 5/2006 | Goia et al. | 502/326 |
| 2006/0105910 A1 * | 5/2006 | Zhou et al. | 502/338 |
| 2007/0009417 A1 * | 1/2007 | Wong et al. | 423/351 |

FOREIGN PATENT DOCUMENTS

| | | |
|---|---|---|
| EP | 1 334 747 | 9/2003 |
| EP | 0 864 362 | 11/2003 |
| JP | 10330103 | 12/1998 |
| WO | WO 00/59635 | 10/2000 |
| WO | WO 02/14217 | 2/2002 |

OTHER PUBLICATIONS

Ahmadi, et al., "Shape-Controlled Synthesis of Colloidal Platinum Nanoparticles", Science, vol. 272, pp. 1924-1926 (Jun. 28, 1996).
Henglein, et al., "Absorption Spectrum and Some Chemical Reactions of Colloidal Platinum in Aqueous Solution", 99 J. Phys. Chem. 14120-14136 (1995).
Petroski, et al., "Kinetically Controlled Growth and Shape Formation Mechanism of Plantium Nanoparticles", 102 J. Phys. Chem. B 3316-3320 (1998).

* cited by examiner

*Primary Examiner*—Wayne Langel
(74) *Attorney, Agent, or Firm*—Workman Nydegger

(57) ABSTRACT

Metal-containing colloids are manufactured by reacting a plurality of metal ions and a plurality of organic agent molecules to form metal complexes in a mixture having a pH greater than about 4.25. The metal complexes are reduced for at least 0.5 hour to form stable colloidal nanoparticles. The extended reduction time improves the stability of the colloidal particles as compared to shorter reduction times. The stability of the colloidal particles allows for colloids with higher concentrations of metal to be formed. The concentration of metal in the colloid is preferably at least about 150 ppm by weight.

26 Claims, No Drawings

STABLE CONCENTRATED METAL COLLOIDS AND METHODS OF MAKING SAME

BACKGROUND OF THE INVENTION

1. The Field of the Invention

The present invention relates to the manufacture of colloidal nanoparticles used to manufacture catalysts. More particularly, the invention relates to methods of making stable concentrated colloids.

2. Related Technology

Particulate catalysts are an important component of many industrial applications such as refining, organic synthesis, fine chemicals manufacturing, and many other industrial processes. Many of these catalyzed reactions require the use of precious metals such as platinum and palladium. Much effort has been made to make high performance catalysts that improve product yields for a given amount of precious metal used.

One technique for making high performance catalysts is to form particles in a solution using metal salts and an organic dispersing agent. The metal salts are dissolved in a solvent, reacted with the organic agent, and then reduced to cause formation of nanoparticles dispersed in the solvent. Because the particles are very small, e.g., less than 1 micron, the dispersed particles form a colloid. The colloidal particles are typically deposited on a catalyst support.

One problem with making catalysts through a colloidal process is that the concentration of metal must be kept low to prevent precipitation and agglomeration of the metal. Using known manufacturing techniques, attempts to make concentrated colloids have resulted in loss of the precious metal particles. Concentrating the colloid destabilizes the particles and causes the particles to agglomerate and/or precipitate. Particles that precipitate are not suitable for use as high performance catalysts and/or cannot be easily deposited on a support material.

Consequently, existing methods for manufacturing supported nanoparticles catalyst use metal colloids that have dilute concentrations of metal particles. The low concentration metal colloids are somewhat difficult to use because of the relatively large solvent requirements. If the colloid is to be shipped, the excess weight and volume of the solvent significantly increases shipping costs. In addition, applying the particles to a support material is more difficult and expensive because the excess solvent must be removed.

BRIEF SUMMARY OF THE INVENTION

The present invention provides a method for manufacturing stable concentrated colloids containing metal nanoparticles. The stabilized concentrated colloid is manufactured from metal ions and an organic agent. The complex that forms between the metal ions and organic agent is then reduced using a reducing agent. The reducing agent is applied to the reaction mixture for at least 30 minutes to reduce the metal atoms and to improve the stability of the nanoparticles formed in the mixture. Preferably, the pH of the reaction mixture is initially at least about 4.25.

The method of manufacturing the nanoparticles of the present invention generally includes (i) providing a plurality of catalytic metal atoms, (ii) providing a plurality of organic agent molecules, each organic agent molecule comprising at least one functional group capable of bonding with the metal atoms, (iii) reacting the metal atoms with the organic agent molecules in a solvent to form a mixture comprising a plurality of complexed metal atoms and having a pH of at least about 4.25, and (iv) reducing the complexed metal atoms in the mixture for a period of time greater than 30 minutes using a reducing agent such that stable colloidal nanoparticles form in the mixture.

The organic dispersing agent includes at least one functional group that can bond to the catalyst atoms. The organic dispersing agent can also include one or more functional groups for bonding with a support material. Examples of suitable functional groups for bonding with the catalyst atoms and/or the support material include one or more of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide. In a preferred embodiment, the organic dispersing agent is a polyacrylic acid or a polyacrylate salt.

The stabilization of the colloid caused by reducing the complexed metal ions for an extended period of time is surprising and unexpected since it would be expected that reduction would be complete within 20 minutes. It is believed that reducing the metal atoms for a period greater than 30 minutes can stabilize the metal particles formed in the reaction by eliminating partially reduced metal atoms (i.e., cationic metal atoms) that can cause agglomeration. At pH levels greater than about 4.25, more preferably greater than 4.75, and most preferably greater than 5.0, complexed metal atoms that have been treated with a reducing agent for 30 minutes or more tend to not agglomerate, thereby reducing precipitation of metal atoms and/or nanocatalyst particles.

The stability of the colloid has a positive effect on the ability to manufacture the colloid in a more concentrated form. Since particle formation generates protons, more concentrated mixtures of metal atoms will result in a colloid with a lower pH. In a dilute solution of metals, the solvent can more easily buffer the increase in proton concentration. However, by stabilizing the metal atoms with an extended reduction period according to the present invention, stable colloids at lower pH levels can be achieved.

These and other advantages and features of the present invention will become more fully apparent from the following description and appended claims as set forth hereinafter.

DETAILED DESCRIPTION OF THE PREFERRED EMBODIMENTS

I. Introduction

The present invention relates to metal colloids containing metal nanoparticles, methods of making the colloids, and supported nanocatalyst manufactured therefrom. The method for preparing the metal-containing colloids generally includes reacting a plurality of metal ions and a plurality of organic agent molecules in solution to form metal complexes in a mixture having a pH greater than about 4.25. The metal complexes are reduced for at least 30 minutes to form stable colloidal nanoparticles. The extended reduction time improves the stability of the colloidal particles as compared to shorter reduction times. The stability of the colloidal particles allows for colloids with higher concentrations of metal.

For purposes of the present invention, the term "particle size" refers to average particle size and "nanoparticle" refers to a particle having a particle size between about 1 nm and about 1000 nm.

II. Components Used to Make Metal-Containing Colloids and Supported Catalysts

A. Catalytic Metal Ions

Any metals or group of metals that can react to form a complex with the organic agent molecules can be used to form colloids according to the present invention. The catalytic metals can exhibit primary catalytic activity or can be used as promoters or modifiers. Exemplary metals include noble metals, base transition metals, and rare earth metals.

Examples of base transition metals that may exhibit catalytic activity include, but are not limited to, titanium, vanadium, chromium, manganese, iron, cobalt, nickel, copper, zinc, zirconium, molybdenum, tin, antimony, tungsten, and the like. These may be used alone, in various combinations with each other, or in combinations with other elements, such as noble metals, alkali metals, alkaline earth metals, rare earth metals, or non-metals.

Examples of noble metals, also referred to as platinum-group metals, which exhibit catalytic activity, include platinum, palladium, iridium, gold, osmium, ruthenium, rhodium, rhenium, and the like. These may be used alone, in various combinations with each other, or in combinations with other elements, such as base transition metals, alkali metals, alkaline earth metals, rare earth metals, or non-metals.

Examples of rare earth metals that exhibit catalytic activity include, but are not limited to, lanthanum and cerium. These may be used alone, in various combinations with each other, or in combinations with other elements, such as base transition metals, noble metals, alkali metals, alkaline earth metals, or non-metals.

Optionally, non-transition metals can also be included, typically as promoters or modifiers. Suitable non-transition metals include alkali metals and alkaline earth metals, such as sodium, potassium, magnesium, calcium, etc., and non-metals such as phosphorus, sulfur, oxygen, and halides.

B. Organic Dispersing Agents and Organic Dispersing Agent Molecules

The organic dispersing agent, also referred to as a dispersing agent or an organic agent, is selected to promote the formation of nanocatalyst particles that have a desired size, stability, and/or uniformity. The dispersing agent molecules react with the metal ions to form ligands complexed with the metal ions.

Dispersing agents suitable for bonding metal ions include a variety of small organic molecules, polymers and oligomers. The dispersing agent interacts and bonds with metal ions dissolved or dispersed within an appropriate solvent or carrier. Bonding can occur through various suitable mechanisms, including ionic bonding, covalent bonding, Van der Waals interaction/bonding, lone pair electron bonding, or hydrogen bonding.

To provide the bonding between the dispersing agent molecules and the metal ions, the dispersing agent molecules include one or more appropriate functional groups. In one embodiment, the functional groups comprise a carbon atom bonded to at least one electron-rich atom that is more electronegative than the carbon atom and that is able to donate one or more electrons so as to form a bond or attraction with a metal ion. Preferred dispersing agents include functional groups which have either a charge or one or more lone pairs of electrons that can be used to complex a metal ion. These functional groups allow the dispersing agent to have a strong binding interaction with the metal ions.

In an exemplary embodiment, the functional groups of the dispersing agent comprise one or more members selected from the group of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide. The dispersing agent can be monofunctional, bifunctional, or polyfunctional.

Examples of suitable monofunctional dispersing agents include alcohols such as ethanol and propanol and carboxylic acids such as formic acid and acetic acid. Useful bifunctional dispersing agents include diacids such as oxalic acid, malic acid, malonic acid, maleic acid, succinic acid, and the like; dialcohols such as ethylene glycol, propylene glycol, 1,3-propanediol, and the like; hydroxy acids such as glycolic acid, lactic acid, and the like. Useful polyfunctional dispersing agents include sugars such as glucose, polyfunctional carboxylic acids such as citric acid, EDTA, pectins, cellulose, and the like. Other useful dispersing agents include ethanolamine, mercaptoethanol, 2-mercaptoacetate, amino acids, such as glycine, and sulfonic acids, such as sulfobenzyl alcohol, sulfobenzoic acid, sulfobenzyl thiol, and sulfobenzyl amine. The dispersing agent may even include an inorganic component (e.g., silicon-based).

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

In addition to the characteristics of the dispersing agent, it can also be advantageous to control the molar ratio of dispersing agent to the catalyst atoms in a catalyst suspension. A more useful measurement is the molar ratio between dispersing agent functional groups and catalyst atoms. For example, in the case of a divalent metal ion two molar equivalents of a monovalent functional group would be necessary to provide the theoretical stoichiometric ratio. Typically the molar ratio of dispersing agent functional groups to catalyst atoms is preferably in a range of about 0.001:1 to about 50:1. For hydrogen peroxide catalysts the ratio is advantageously in a range of about 0.5:1 to about 40:1, more preferably in a range from about 1:1 to about 35:1, and most preferably in a range of about 3:1 to about 30:1.

The use of the dispersing agent allows for the formation of very small and uniform nanoparticles. In general, the nanocatalyst particles formed in the presence of the dispersing agent are preferably less than about 20 nm in size. In some cases, the nanocatalyst particles may be atomically dispersed. The nanocatalyst particles more preferably have an average particle size less than about 15 nm, and most preferably less than about 10 nm.

Finally, depending on the desired stability of the nanocatalyst particles on the support material, the dispersing agent can be selected to bond (e.g., covalently bond) with the support material so as to anchor or tether the nanocatalyst particles and/or atoms to the support material. While the dispersing agent has the ability to inhibit agglomeration of the nanocatalyst particles in the absence of anchoring, chemically bonding the nanocatalyst particles to the support material through a ligand is a particularly effective mechanism for preventing agglomeration.

Suitable functional groups for bonding with the support are the same types of functional groups as those suitable for bonding to the metal ions. However, dispersing agent molecules can have different functional groups for bonding to the support and also for bonding to the metal ions.

C. Solvents and Chemical Modifiers

The metal ions are prepared in a solution that can be applied to a catalyst support material. The solution can contain various solvents, including water and organic solvents. Solvents participate in catalyst formation by providing a solution for the interaction of metal ions and the dispersing agent molecules. Suitable solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

Other chemical modifiers may also be included in the liquid mixture. For example, acids or bases may be added to adjust the pH of the mixture. It is also possible to add acids and bases as a solid material. For example, ion exchange resins that have basic or acid functional groups can be used. The solid material can be easily separated from the final colloid using simple techniques such as centrifugation and filtration. Surfactants may be added to adjust the surface tension of the mixture, or to stabilize the nanoparticles.

D. Reducing Agent

A reducing agent is used to reduce the metal ions to a lower oxidation state. Any compound capable of reducing the metal ions can be used. In a preferred embodiment, the reducing agent is hydrogen. Other suitable reducing agents include small organic molecules such as formaldehyde, formic acid, methanol, ethylene, and hydrides such as lithium aluminum hydride and sodium borohydride.

E. Support Materials

The nanocatalyst particles are deposited and/or formed on a support material. The support may be organic or inorganic. It may be chemically inert, or it may serve a catalytic function complementary to the nanocatalyst. The support may be in a variety of physical forms. It may be porous or nonporous. It may be a three-dimensional structure, such as a powder, granule, tablet, or extrudate. The support may be a two-dimensional structure such as a film, membrane, or coating. It may be a one-dimensional structure such as a narrow fiber.

One class of support materials includes porous, inorganic materials, such as alumina, silica, titania, kieselguhr, diatomaceous earth, bentonite, clay, zirconia, magnesia, metal oxides, zeolites, and calcium carbonate. Another useful class of supports includes carbon-based materials, such as carbon black, activated carbon, graphite, fluoridated carbon, and the like. Other supports include polymers and other inorganic solids, metals, and metal alloys.

The nanocatalyst particles can be deposited within a wide range of loadings on the support material. The loading can range from about 0.01% to about 70 wt % of the supported nanocatalyst particles, more preferably in a range of about 0.1% to about 25%. In the case where the support material is porous, it is preferable for the surface area to be at least about 20 $m^2/g$, more preferably at least about 50 $m^2/g$.

III. Methods of Making Colloids and Supported Nanocatalysts

The process for manufacturing colloids according to the present invention can be broadly summarized as follows. First, one or more types of catalytic metal atoms (e.g., in the form of a ground state metal or ionized metal salt) and one or more types of dispersing agent molecules (e.g., in the form of a carboxylic acid salt) are selected. The metal atoms and the dispersing agent molecules are dissolved in a solvent and reacted to form a plurality of complexed metal atoms. The solvent, catalytic metal atoms, and the dispersing agent molecules are selected such that the resulting mixture has a pH of at least about 4.25, more preferably at least about 4.75, and most preferably at least about 5.0. In an alternative embodiment, the pH is in a range from about 4.25 to about 7.0, more preferably from about 5.5 to about 6.0.

In a preferred embodiment, the metal atoms are provided as a halogen salt (e.g. palladium chloride) in a solution. In this embodiment, the solution of the metal halogen salt preferably has a low concentration of mineral acid, such as HCl. Preferably, the weight percent acid in the metal salt solution is less than about 15%, and more preferably less than about 10%. Solutions of precious metal salts with low acid concentrations can be prepared or can be purchased commercially (e.g:, a palladium solution with 7% w/w free acid (as HCl) can be purchased from Colonial Metals Co.). Minimizing the amount of halogen ions in the catalyst mixture can also be advantageous since halogens can be corrosive to equipment used in manufacturing hydrogen peroxide.

Once the metal atoms are complexed with the organic agent, the complexed metal atoms are reduced with a reducing agent to form a plurality of nanocatalyst particles dispersed in the solvent, thereby forming a colloid. The solution is exposed to the reducing agent for an extended period of time (e.g., at least 30 minutes) to improve the stability of the colloid such that it can be made more concentrated without causing significant precipitation. In a preferred embodiment reduction is carried out for at least 1 hour, more preferably at least 2 hours, and most preferably at least 6 hours.

The concentration of the metal in the final colloids of the present invention can be increased as compared to colloids that are not stabilized using extended reduction times. In an exemplary embodiment the final concentration of the metal in the colloid of the present invention is preferably greater than about 150 ppm by weight, more preferably greater than about 200 ppm by weight, and most preferably greater than about 300 ppm by weight.

The concentration of the metal in the colloid is a consequence of the ratio of solvent to metal ions. Increasing the amount of solvent decreases the metal concentration, while decreasing the amount of solvent increases the metal concentration. In the method of the present invention, the metal concentration can be provided by selecting an initial ratio of metal to solvent that provides the desired concentration ratio or alternatively, the ratio of metal to solvent can be increased after the nanoparticles are formed by removing a portion of the solvent. A combination of both of these embodiments can also be performed. In the first embodiment, the colloid is prepared at full concentration (i.e., the concentration of the metal is close to or the same as the final concentration). The metal atoms, organic dispersing agent, solvent, and other components are mixed together in an appropriate amount of solvent such that the colloid will have a desired final concentration of metal (e.g., 150 ppm by weight). In an alternative embodiment, the colloidal particles can be formed at a lower concentration and then a portion of the solvent can be removed (e.g., by evaporation) to increase the metal concentration to a desired final concentration. Preparing the colloid in a concentrated form can be more advantageous than concentrating the colloid after particle formation since preparing the colloid at full concentration avoids the expenses of concentrating the colloid.

IV. EXAMPLES

The following examples provide formulas for making concentrated colloids containing metal nanoparticles. The formulas in the examples were prepared using a $Pd^{2+}$ solution, a $Pt^{4+}$ solution, and a polyacrylate solution.

A 14.34% (w/w) Palladium solution was prepared containing 7.13% (w/w) free acid (as HCl). (This solution can also be purchased directly from Colonial Metals Co.). A 0.010 wt % Platinum solution was prepared by mixing 0.2614 g $H_2PtCl_6$ with 1000 ml of deionized water. A 6.75 wt % template agent was prepared by diluting 15 g of 45 wt % polyacrylic acid sodium salt solution (MW ca. 1200) to a total weight of 100 g with deionized water.

Example 1

611 ppm Concentrated Colloid

Example 1 describes a method for making a colloid with a metal concentration of 611 ppm by weight, according to the present invention. 2.508 g of the 14.34% palladium solution, 72 ml of 0.010% Pt solution, and 60 ml of 6.75% polyacrylic acid solution were mixed together and diluted to 600 ml with deionized water. The solution was purged with nitrogen for 2 hrs at 100 ml/min and then purged with hydrogen overnight (approximately 12 hrs). After about 7 minutes of the hydrogen purge, the color of the mixture changes from dark amber to deep black. A thin mirror-like film formed on the surface of the mixture but then disappeared with continued reduction of between 20 minutes and 1 hr. Following the extended reduction there was no visual indication of any precipitation and the colloid was left standing for than a month without any observable precipitation. The pH of the colloid was 5.84.

Example 2

1222 ppm Concentrated Colloid

Example 2 describes a method for making a colloid with a metal concentration of 1222 ppm by weight, according to the present invention. Example 2 was prepared using the procedure described in Example 1 except that 2.508 g of the 14.34% palladium solution, 72 ml of 0.010% Pt solution, and 60 ml of 6.75% Polyacrylic acid solution were mixed together and diluted to 300 ml with deionized water. Following the extended reduction there was no visual indication of any precipitation and the colloid was left standing for more than a month without any observable precipitation. The pH of the colloid was 5.77.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for making a stable, concentrated metal nanoparticle colloid, comprising:
   (i) mixing together a solvent, a plurality of metal atoms, and a plurality of organic agent molecules, each organic agent molecule comprising at least one functional group capable of bonding with the metal atoms;
   (ii) reacting the metal atoms with the organic agent molecules to form a mixture comprising a plurality of complexed metal atoms and having a pH greater than about 4.25 and less than 7.0; and
   (iii) exposing the mixture to a reducing agent for a period of time of at least 0.5 hour in order to reduce the complexed metal atoms and form stable colloidal metal nanoparticles in the mixture,
   wherein the concentration of metal in the concentrated metal nanoparticle colloid is greater than about 150 ppm by weight.

2. A method as in claim 1, wherein the mixture is exposed to the reducing agent for a period of time of at least about 1 hour.

3. A method as in claim 1, wherein the mixture is exposed to the reducing agent for a period of time of at least about 6 hours.

4. A method as in claim 1, wherein the pH of the mixture is greater than about 4.75 and less than 7.0.

5. A method as in claim 1, wherein the pH of the mixture is greater than about 5 and less than 7.0.

6. A method as in claim 1, wherein the metal atoms are provided as at least one metal salt.

7. A method as in claim 1, wherein the concentration of metal in the concentrated metal nanoparticle colloid is greater than about 200 ppm by weight.

8. A method as in claim 1, wherein the concentration of metal in the concentrated metal nanoparticle colloid is greater than about 300 ppm by weight.

9. A method as in claim 1, further comprising removing a portion of the solvent from the mixture to achieve the concentration of metal in the concentrated metal nanoparticle colloid.

10. A method as in claim 1, wherein the reducing agent comprises hydrogen gas.

11. A method as in claim 1, wherein the size of the metal nanoparticles is less than about 10 nm.

12. A method as in claim 1, wherein the pH of the mixture is in a range of about 5 to about 6.

13. A colloidal suspension of metal nanoparticles in a solvent manufactured according to the method of claim 1.

14. A method for making a stable, concentrated metal nanoparticle colloid, comprising:
   (i) mixing together a solvent, a plurality of metal atoms, and an organic polymer having a plurality of functional groups capable of bonding with the metal atoms, the organic polymer being selected from the group consisting of polyacrylates, polyvinylbenzoates, polyvinyl sulfate, polyvinyl sulfonates, sulfonated styrene, polybisphenol carbonates, polybenzimidizoles, polypyridine, sulfonated polyethylene terephthalate, polyvinyl alcohol, polyethylene glycol, polypropylene glycol, and mixtures thereof, the organic polymer providing a molar ratio of functional groups to metal atoms in a range of about 1:1 to about 35:1;
   (ii) reacting the metal atoms with the functional groups of the organic polymer to form a plurality of complexed metal atoms in a mixture having a pH in a range from about 4.25 to about 7.0; and
   (iii) passing hydrogen through the mixture for a period of time greater than about 0.5 hour and allowing stable colloidal nanoparticles to form in the mixture,
   wherein the concentration of metal in the stable, concentrated metal nanoparticle colloid is greater than about 150 ppm by weight.

15. A method as in claim 14, wherein the hydrogen is passed through the mixture for a period of time greater than about 1 hour.

16. A method as in claim 14, wherein the hydrogen is passed through the mixture for a period of time greater than about 6 hours.

17. A method as in claim 14, wherein the metal atoms comprise one or more metals selected from the platinum-group metals.

18. A method as in claim 14, wherein the metal ions are provided as one or more solutions having less than about 15% inorganic acid, and substantially no other inorganic acid is added to the mixture.

19. A method as in claim 14, wherein the metal ions are provided as one or more solutions having less than about 10% inorganic acid, and substantially no other inorganic acid is added to the mixture.

20. A method as in claim 14, wherein the organic polymer provides a molar ratio of functional groups to metal atoms in a range of about 3:1 to about 30:1.

21. A stable, concentrated colloidal metal nanoparticle composition, comprising:
a solvent; and
a plurality of metal nanoparticles suspended in the solvent so as to form a stable, concentrated colloidal metal nanoparticle composition that is stable for at least 24 hours, each metal nanoparticle comprising a plurality of metal atoms and having a plurality of organic dispersing agent molecules bonded to at least a portion of the metal atoms,
wherein the organic dispersing agent molecules comprise at least one member selected from the group consisting of formic acid, acetic acid, oxalic acid, malic acid, malonic acid, maleic acid, succinic acid, hydroxy acids, glycolic acid, lactic acid, sugars, glucose, citric acid, EDTA, pectins, cellulose, amino acids, glycine, sulfobenzyl alcohol, sulfobenzoic acid, sulfobenzyl thiol, sulfobenzyl amine, polyacrylates polyvinylbenzoates, polyvinyl sulfate, polyvinyl sulfonates, sulfonated styrene, polybisphenol carbonates, polybenzimidizoles, polypyridine, sulfonated polyethylene terephthalate, polyvinyl alcohol, polyethylene glycol, polypropylene glycol, and mixtures thereof,
the organic dispersing agent molecules providing a molar ratio of functional groups to metal atoms in a range of about 1:1 to about 35:1,
wherein the stable, concentrated colloidal metal nanoparticle composition has a metal concentration greater than about 150 ppm by weight and a pH greater than about 4.25 and less than 7.0.

22. A stable, concentrated colloidal metal nanoparticle composition as in claim 21, wherein the stable, concentrated colloidal metal nanoparticle composition has a metal concentration greater than about 200 ppm by weight.

23. A stable, concentrated colloidal metal nanoparticle composition as in claim 21, wherein the stable, concentrated colloidal metal nanoparticle composition has a metal concentration greater than about 300 ppm by weight.

24. A stable, concentrated colloidal metal nanoparticle composition as in claim 21, wherein the colloidal metal nanoparticle composition has a pH greater than about 4.75 and less than 7.0.

25. A stable, concentrated colloidal metal nanoparticle composition as in claim 21, wherein the colloidal metal nanoparticle composition has a pH greater than about 5 and less than 7.0.

26. A stable, concentrated colloidal metal nanoparticle composition as in claim 21, wherein the pH of the concentrated colloidal metal nanoparticle composition is in a range of about 5 to about 6.

* * * * *

UNITED STATES PATENT AND TRADEMARK OFFICE
CERTIFICATE OF CORRECTION

PATENT NO.        : 7,514,476 B2             Page 1 of 1
APPLICATION NO.   : 11/378877
DATED             : April 7, 2009
INVENTOR(S)       : Parasher et al.

It is certified that error appears in the above-identified patent and that said Letters Patent is hereby corrected as shown below:

Column 1
Line 40, change "catalyst" to --catalysts--

Column 2
Line 36, "pII" to --pH--

Column 7
Line 23, before "than" insert --more--
Line 59, change "pII" to --pH--

Signed and Sealed this

Thirteenth Day of October, 2009

David J. Kappos
*Director of the United States Patent and Trademark Office*